US008740064B2

(12) United States Patent
Griffin et al.

(10) Patent No.: US 8,740,064 B2
(45) Date of Patent: Jun. 3, 2014

(54) PAYMENT PROCESSING SYSTEM INCLUDING MOBILE WIRELESS COMMUNICATIONS DEVICE TO SEND A PAYMENT CONFIRMATION TO A TRANSACTION TERMINAL AND ASSOCIATED METHODS

(75) Inventors: Jason Tyler Griffin, Kitchener (CA); Herbert Anthony Little, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 56 days.

(21) Appl. No.: 13/082,701

(22) Filed: Apr. 8, 2011

(65) Prior Publication Data
US 2012/0259717 A1 Oct. 11, 2012

(51) Int. Cl.
*G06Q 40/00* (2012.01)

(52) U.S. Cl.
USPC .......................... 235/379; 235/383; 455/414.1

(58) Field of Classification Search
USPC .................. 235/379, 383, 380, 381; 455/403, 455/432.3, 435.1, 435.2, 414.3, 405–409, 455/414.1; 705/15, 16, 17
See application file for complete search history.

(56) References Cited

U.S. PATENT DOCUMENTS

| 6,577,861 | B2* | 6/2003 | Ogasawara | 455/419 |
| 6,934,532 | B2* | 8/2005 | Coppinger et al. | 455/412.1 |
| 7,124,937 | B2* | 10/2006 | Myers et al. | 235/380 |
| 7,141,918 | B2* | 11/2006 | Scott | 310/339 |
| 7,203,477 | B2* | 4/2007 | Coppinger et al. | 455/403 |
| 7,203,485 | B2* | 4/2007 | Coppinger et al. | 455/418 |
| 7,213,766 | B2* | 5/2007 | Ryan et al. | 235/492 |
| 7,254,390 | B2* | 8/2007 | Coppinger et al. | 455/432.3 |
| 7,273,168 | B2 | 9/2007 | Linlor | 235/380 |
| 7,286,815 | B2* | 10/2007 | Coppinger et al. | 455/406 |
| 7,286,818 | B2* | 10/2007 | Rosenberg | 455/414.1 |
| 7,330,714 | B2* | 2/2008 | Rosenberg | 455/412.1 |
| 7,407,094 | B2* | 8/2008 | Myers et al. | 235/380 |

(Continued)

FOREIGN PATENT DOCUMENTS

| EP | 1513120 | 3/2005 | ............. G07F 19/00 |
| EP | 2088549 | 8/2009 | ............. G06Q 20/00 |

(Continued)

OTHER PUBLICATIONS

Ashish Nirkhe, "Contact-less payment solution using NFC technology in mobile cell phone device," IP.com No. IPCOM000205538D, Mar. 30, 2011.*

(Continued)

*Primary Examiner* — Andrew Joseph Rudy
(74) *Attorney, Agent, or Firm* — Allen, Dyer, Doppelt, Milbrath & Gilchrist, P.A. Attorneys at Law

(57) ABSTRACT

A payment processing system includes a transaction terminal having a merchant account associated therewith and including a first wireless device. The payment processing system also includes a payment server, and a mobile wireless communications device having a purchaser account associated therewith and including a second wireless device and a processor coupled thereto and configured to send transaction information to the payment server. The payment server is configured to cause a transfer of funds from the purchaser account to the merchant account based upon the transaction information, and to send payment confirmation to the mobile wireless communications device based upon the transfer of funds. The processor is configured to send the payment confirmation to the transaction terminal via the first and second wireless devices.

18 Claims, 8 Drawing Sheets

(56) References Cited

U.S. PATENT DOCUMENTS

| | | | |
|---|---|---|---|
| 7,817,981 B2* | 10/2010 | Coppinger et al. | 455/403 |
| 7,822,410 B2* | 10/2010 | Coppinger et al. | 455/419 |
| 7,861,930 B2* | 1/2011 | Esplin et al. | 235/383 |
| 7,926,717 B2* | 4/2011 | Mcintosh | 235/385 |
| 7,962,137 B2* | 6/2011 | Coppinger et al. | 455/435.2 |
| 7,962,369 B2* | 6/2011 | Rosenberg | 705/26.8 |
| 8,096,468 B2* | 1/2012 | Myers et al. | 235/381 |
| 8,116,749 B2* | 2/2012 | Proctor et al. | 455/414.3 |
| 8,205,794 B2* | 6/2012 | Myers et al. | 235/380 |
| 8,229,852 B2* | 7/2012 | Carlson | 705/44 |
| 8,233,841 B2* | 7/2012 | Griffin et al. | 455/41.1 |
| 8,295,834 B2* | 10/2012 | Coppinger et al. | 455/435.1 |
| 8,295,835 B2* | 10/2012 | Coppinger et al. | 455/435.1 |
| 8,352,360 B2* | 1/2013 | De Judicibus et al. | 705/39 |
| 8,369,842 B2* | 2/2013 | Proctor et al. | 455/414.3 |
| 8,374,916 B2* | 2/2013 | White | 705/17 |
| 8,385,896 B2* | 2/2013 | Proctor et al. | 455/414.3 |
| 8,577,731 B1* | 11/2013 | Cope et al. | 705/17 |
| 8,630,905 B2* | 1/2014 | Fisher | 705/16 |
| 8,630,906 B2* | 1/2014 | Fisher | 705/16 |
| 2007/0108269 A1 | 5/2007 | Benco et al. | 235/380 |
| 2008/0257952 A1* | 10/2008 | Zandonadi | 235/379 |
| 2010/0131347 A1* | 5/2010 | Sartipi | 705/14.33 |
| 2010/0320266 A1 | 12/2010 | White | 235/375 |
| 2011/0321127 A1* | 12/2011 | Pitroda et al. | 726/3 |
| 2012/0203664 A1* | 8/2012 | Torossian et al. | 705/26.41 |

FOREIGN PATENT DOCUMENTS

| | | | |
|---|---|---|---|
| EP | 2128809 | 12/2009 | G06Q 20/00 |
| WO | WO2004/105359 | 12/2004 | |
| WO | WO2008/035148 | 3/2008 | G06Q 20/00 |
| WO | WO2008/114088 | 9/2008 | |
| WO | WO2010/019908 | 2/2010 | G06Q 20/00 |

OTHER PUBLICATIONS

Bannan, "Cell phone payment system options multiply", CreditCards.com newsletter, downloaded Dec. 8, 2010, pp. 1-4.

Flatley, "AT&T, T-Mobile, and Verizon announce ISIS national mobile commerce network", engadget.com, posted Nov. 2010, downloaded Dec. 8, 2010, pp. 1-8.

* cited by examiner

PAYMENT PROCESSING SYSTEM INCLUDING MOBILE WIRELESS COMMUNICATIONS DEVICE TO SEND A PAYMENT CONFIRMATION TO A TRANSACTION TERMINAL AND ASSOCIATED METHODS

TECHNICAL FIELD

The present disclosure relates to the field of mobile wireless communications devices, and, more particularly, to mobile wireless communications devices for communicating with payment processing systems.

BACKGROUND

Mobile wireless communications devices have become pervasive in today's society, and are carried daily by a large number of individuals. Part of the reason for their popularity is that such mobile wireless communications devices are now capable of more than simple voice communications. Indeed, some mobile wireless communications devices are now capable of acting as a personal digital assistant, performing functions such as keeping a calendar of daily appointments and maintaining a large address book. In addition, some mobile wireless communications devices have connectivity with the Internet via their cellular connection, and are thus capable of e-mail delivery and web browsing.

In addition to carrying a mobile wireless communications device, many individuals also carry a wallet containing numerous cards, such as driver's licenses, credit cards, bank cards, discount cards, rewards cards, and membership cards. This wide variety of cards can lead to a wallet being undesirably thick, taking up more space than desired in a pocket or a purse. One way in which to reduce this burden is to design mobile wireless communications devices that can carry the information contained in such cards (such as account access information), and payment processing systems that can access the information in those mobile wireless communications devices in order to process transactions.

While such mobile wireless communications devices have been successful at reducing the number of cards an individual carries, existing payment processing systems often utilize a point of sale device or transaction terminal with that has connectivity with a payment processing server or clearing house. This leaves a need for new payment processing systems that can operate when the point of sale device or transaction terminal does not have connectivity with the payment processing server or clearing house.

DETAILED DESCRIPTION

Figure 1:
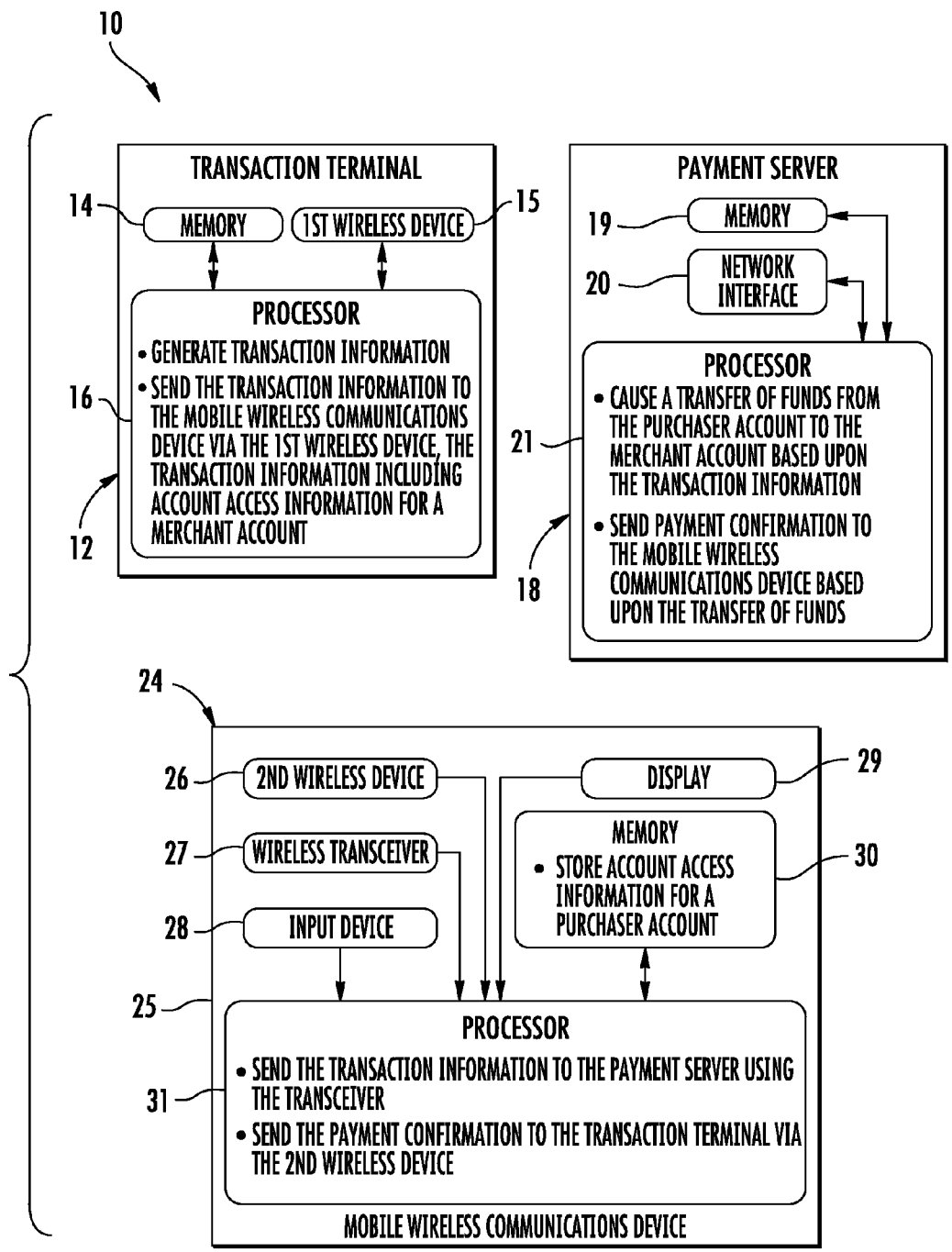
FIG. 1 is a schematic block diagram of an embodiment of a payment processing system, in accordance with the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a payment processing system may include a transaction terminal having a merchant account associated therewith and comprising a first wireless device, a payment server, and a mobile wireless communications device. The mobile wireless communications device may have a purchaser account associated therewith and may comprise a second wireless device and a processor coupled thereto and configured to send transaction information to the payment server. The payment server may be configured to cause a transfer of funds from the purchaser account to the merchant account based upon the transaction information, and to send payment confirmation to the mobile wireless communications device based upon the transfer of funds. The processor may be configured to send the payment confirmation to the transaction terminal via the first and second wireless devices.

This payment processing advantageously allows functioning when the transaction terminal does not have a network connection with the payment server, for example, and instead uses the mobile wireless communications device to facilitate communications with the payment server. This may be particularly useful for use with vending machines, or mobile food vendors, such as catering trucks and hot dog stands.

In some applications, the first and second wireless devices may be first and second near field communications (NFC) devices. The first and second wireless devices may also include, or be, first and second Bluetooth devices, as will be appreciated by those skilled in the art. The transaction terminal may be configured to send the transaction information to the mobile wireless communications device. Indeed, the transaction terminal may be configured to send the transaction information to the mobile wireless communications device via the first and second NFC devices. Additionally or alternatively, the transaction terminal may be configured to send the transaction information to the mobile wireless communications device via the first and second Bluetooth devices and based upon proximity between the first and second NFC devices. Similarly, the mobile wireless communications device may be configured to send the payment confirmation to the transaction terminal via the first and second NFC devices, or via the first and second Bluetooth devices and based upon proximity between the first and second NFC devices.

Additionally or alternatively, the transaction terminal may include a display configured to display the transaction information, and the mobile wireless communications device may have a camera to capture the transaction information on the display. Here, the display may be configured to display the transaction information as a coded image. The coded image may be a barcode, two-dimensional barcode, or QR code, for example.

Similarly, at least one substrate having an image thereon may be positioned adjacent the transaction terminal, and the mobile wireless communications device may have a camera to capture the image. The processor may then be configured to generate the transaction information based upon the captured image. In addition, the image on the at least one substrate may be a coded image.

Likewise, at least one NFC tag having data stored thereon may be positioned adjacent the transaction terminal, and the processor may be configured to cooperate with the second NFC device and to generate the transaction information based upon the stored data. Also, the transaction terminal may include a display and may be configured to present the payment confirmation on the display.

A method aspect is directed to a method of operating a payment processing system comprising a transaction terminal having a merchant account associated therewith and comprising a first near field communications (NFC) device, a payment server, and a mobile wireless communications device comprising a second NFC device and having a purchaser account associated therewith. The method may comprise sending transaction information to the payment server via cooperation between the first and second NFC devices, using a processor of the mobile wireless communications device. The method may also include causing a transfer of funds from the purchaser account to the merchant account based upon the transaction information, and sending payment confirmation to the mobile wireless communications device based upon the transfer of funds, using the payment server. The method may further include sending the payment confirmation to the transaction terminal via cooperation between the first and second NFC devices, using the processor of the mobile wireless communications device.

With reference to FIG. 1, an embodiment of a payment processing system 10 is now described. The payment processing system 10 includes a transaction terminal 12, a payment server 18, and a mobile wireless communications device 24.

The transaction terminal 12 includes a processor 16 coupled to a memory 14 and a first wireless device 15. The payment server 18 includes a processor 21 coupled to a memory 19 and a network interface 20. The network interface 20 may provide the payment server 18 with connectivity to a wide area network, such as the Internet, through which the payment server can communicate with a credit clearing house or bank for effectuating transactions.

As will be explained in detail below, the first wireless device 15 may include a first near field communications (NFC) device. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Example mobile wireless communications devices 24 may include portable or personal media players (e.g., music or MP3 players, video players, etc.), remote controls (e.g., television or stereo remotes, etc.), portable gaming devices, portable or mobile telephones, smartphones, tablet computers, etc. The mobile wireless communications device 24 includes a housing 25 carrying a second wireless device 26 (which may comprise a second NEC device), a wireless transceiver 27, input device 28, display 29, memory 30, and processor 31. The processor 31 is coupled to the second wireless device 26, wireless transceiver 27, input device 28, display 29, and memory 30.

The input device 28 may be a keyboard, touch sensitive pad, trackball, thumbwheel, button, microphone, or other suitable device, for example. It should be appreciated that in some applications, the display 29 may be a touch sensitive display, and may therefore serve as the input device 28. In addition, the wireless transceiver 27 may be a cellular transceiver, and may be configured to perform both voice and data cellular communications.

The memory 30 may include volatile and non-volatile portions, and is configured to store access information for a purchaser account associated with the mobile wireless communications device 24. The purchaser account may be a credit card account, bank account, gift card account, or other suitable account.

The processor 16 of the transaction terminal 12 is configured to generate transaction information, and to send the transaction information to the mobile wireless communications device 25 via the first wireless device 15. This transaction information may include information such as a transaction amount, and account access information for a merchant account associated with the transaction terminal 12.

The mobile wireless communications device 24 receives the transaction information, adds account access information for a purchaser account stored in a memory 30 thereto, and sends the account access information to the payment server 18 using the wireless transceiver 27. The payment server 18 in turn receives the account access information. The processor 21 of the payment server 18 then causes a transfer of funds from the purchaser account to the merchant account based upon the transaction information. The processor 21 sends a payment confirmation to the mobile wireless communications device 24 confirming that the funds have been successfully transferred. The mobile wireless communications device 24 receives the payment confirmation, and then the processor 31 thereof sends the payment confirmation to the transaction terminal 12 via the second wireless device 26.

This payment processing system 10 has an advantage over prior art payment processing systems in that the transaction terminal 12 need not have a network interface for communication with the payment server 18. This makes this payment processing system 10 particularly useful for mobile merchants or merchants with a small amount of space, such as vending machines, catering trucks, hot dog stands, pretzel stands, newsstands, vendors at fairs, etc. Additionally, the payment processing system 10 may provide cost savings compared to other payment processing systems, as connection to a wide area network (such as the Internet) is not necessary.

It should be appreciated that, in some applications, the processor 31 may prompt for entry of a password or authentication phrase via the input device 28 before sending the transaction information to the payment server. This may further increase security, and decrease the likelihood of unwanted transactions.

Figure 2:
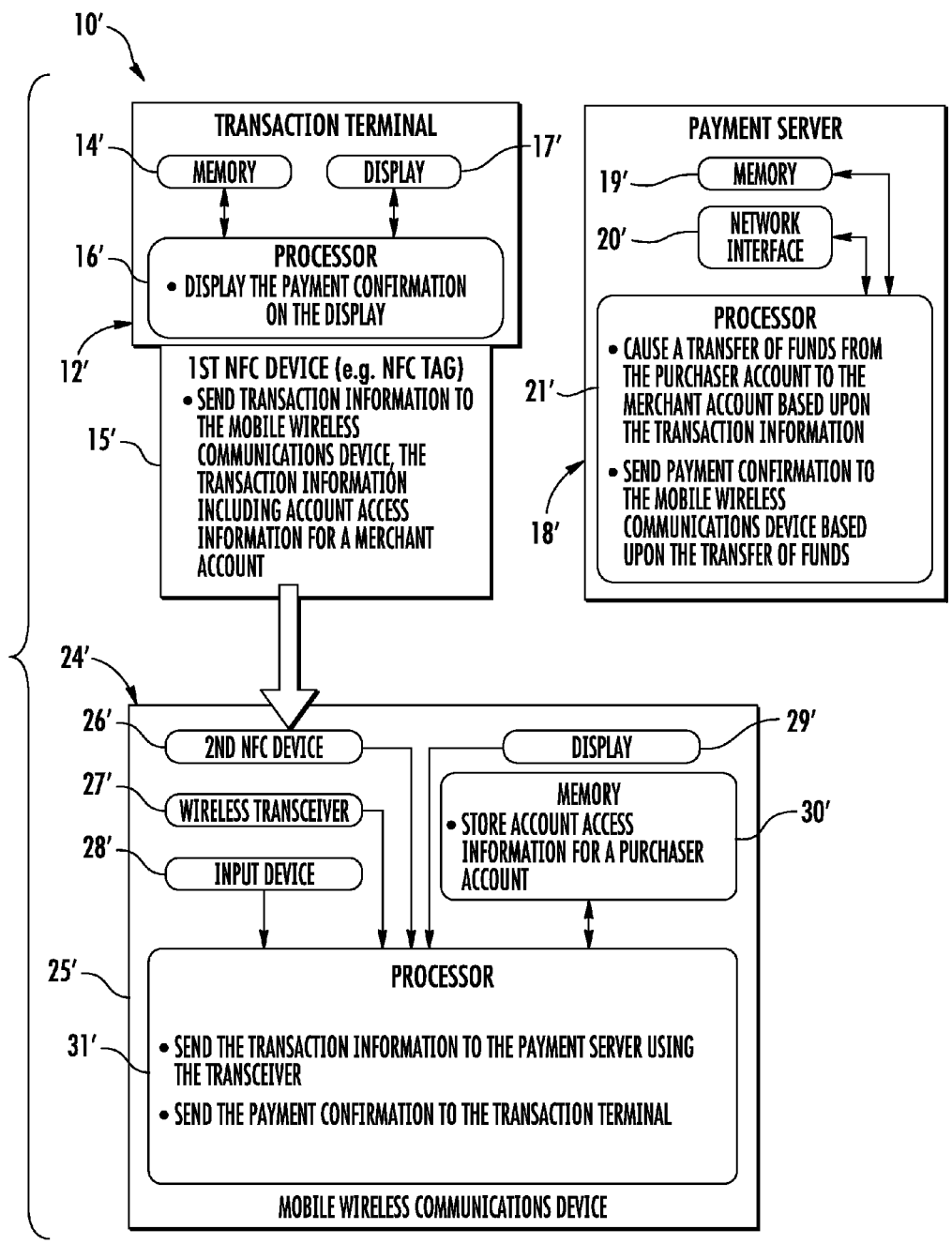
FIG. 2 is a schematic block diagram of an embodiment of a payment processing system where a transaction terminal has an NFC tag associated therewith, in accordance with the present disclosure.

In some situations, the transaction terminal 14 may have a NFC tag. Such an embodiment is now described with reference to FIG. 2.

Here, the transaction terminal 12' has a NFC tag 15' associated therewith. The NFC tag 15' includes the first NFC device, which sends the transaction information to the mobile wireless communications device 24'. The transaction information may be sent when the NFC tag 15' is in proximity with the mobile wireless communications device 24', or when a swipe or bump gesture between the two is performed, for example.

In some applications, operation of the payment processing system 10' may proceed as described above, but the mobile wireless communications device 24' may send the transaction confirmation to the transaction terminal 12' via a communication method other than NFC. Alternatively, the transaction terminal 12' may include another NFC device (not shown), and the mobile wireless communications device 24' may send the transaction confirmation to the transaction terminal via NFC communication. The processor 16' of the transaction terminal 12' displays the payment confirmation on the display 17' thereof. This alerts a user of the transaction terminal 12' that the transfer of funds has been completed. The payment confirmation may additionally or alternatively include a confirmation code which indicates that the transaction was genuine. For example, the confirmation code may be a pre-established word or phrase defined by the merchant, which would be unknown to the purchaser and the mobile wireless communications device 24', thereby increasing the security of the system. The confirmation code may also be a rolling code or a time dependant code, in some applications.

It should be appreciated that the transaction terminal 12' may have multiple NFC tags 15' associated therewith, and that the transaction information may be generated by the processor 31' of the mobile wireless communications device 24' based upon NFC communications with these multiple NFC tags. For example, the transaction terminal 12' may have a NFC tag associated therewith for each item that merchant sells, and a user of the mobile wireless communications device 24' initiates NFC communications with each NFC tag representing an item he or she would like to purchase.

This allows a further simplification of the transaction terminal 12' in that the processor 16' thereof need not be configured to store prices of goods or services for sale, or to compute a total transaction cost. This may also help increase the speed of the transaction.

Figure 3:
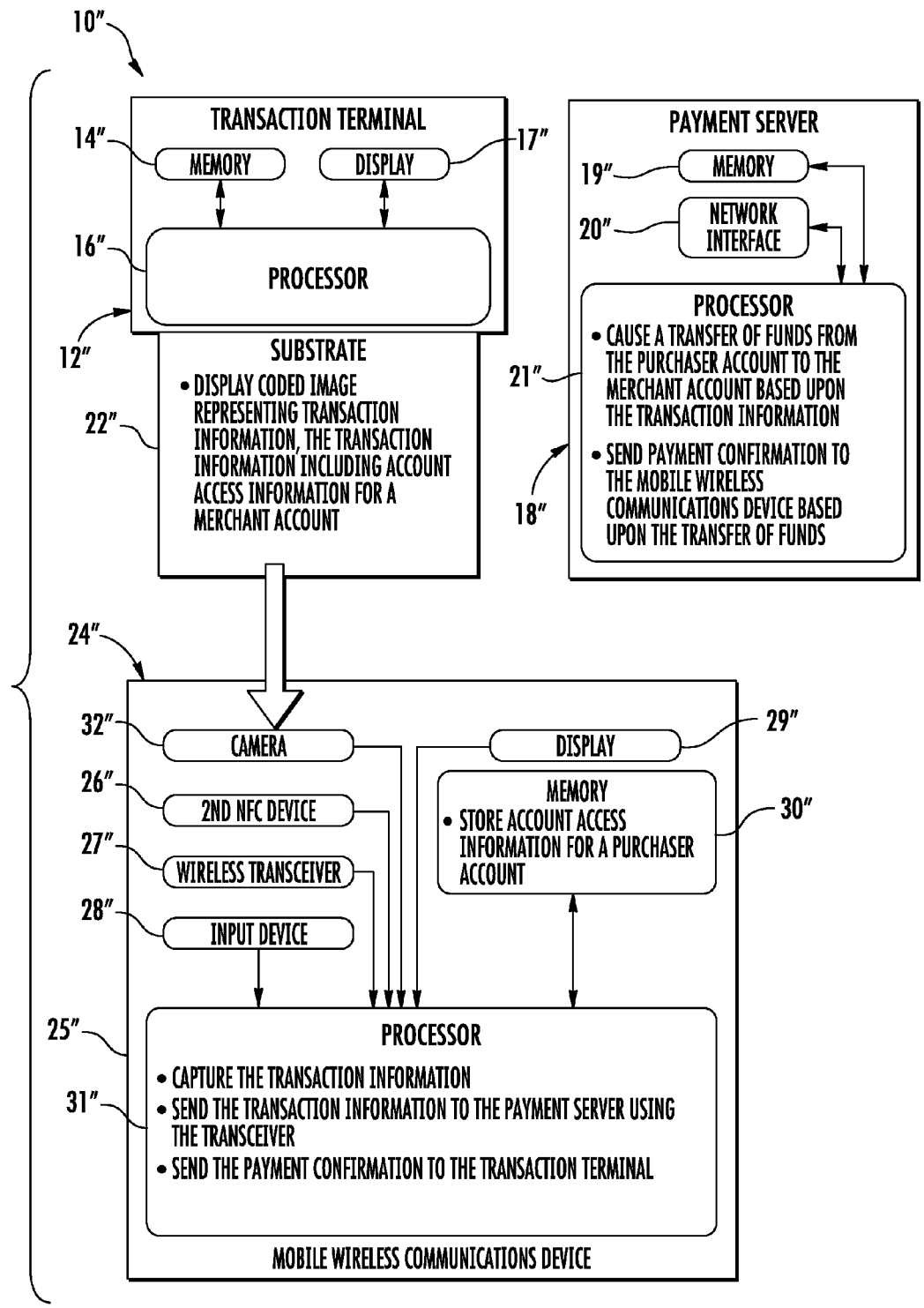
FIG. 3 is a schematic block diagram of an embodiment of a payment processing system where a transaction terminal has a substrate displaying a coded image associated therewith, in accordance with the present disclosure.

In some applications, the transaction terminal 10' need not have an NFC tag 15' associated therewith, but may instead have a substrate displaying an image associated therewith. An example embodiment including this feature is now described with reference to FIG. 3.

Here, the transaction terminal 12" has a substrate 22", such as a sticker or placard, associated therewith. The substrate 22 displays a coded image representing the transaction information. The coded image may be a barcode or QR code, for example, although it should be understood that any coded image would be suitable. Further, in some applications, the image need not be coded, and may instead be an uncoded image (e.g. a price or a product name).

The mobile wireless communications device 24" includes an image sensor, such as a camera 32", that captures the coded image displayed on the substrate 22". The processor 31" of the mobile wireless communications device 24" may then decode the coded image to thereby determine the transaction information. In the case where an uncoded image is used, the processor 31" may employ character or image recognition techniques known to those of skill in the art to determine the transaction information.

Operation of the payment processor system 10" then proceeds as described above. It should be appreciated that like the embodiment of the payment processor system 10' described above with reference to FIG. 2, the transaction terminal 12" may have multiple substrates 22", and the processor 31" of the mobile wireless communications device 24" may generate the transaction information based upon images of those substrates captured by the camera 32".

Figure 4:
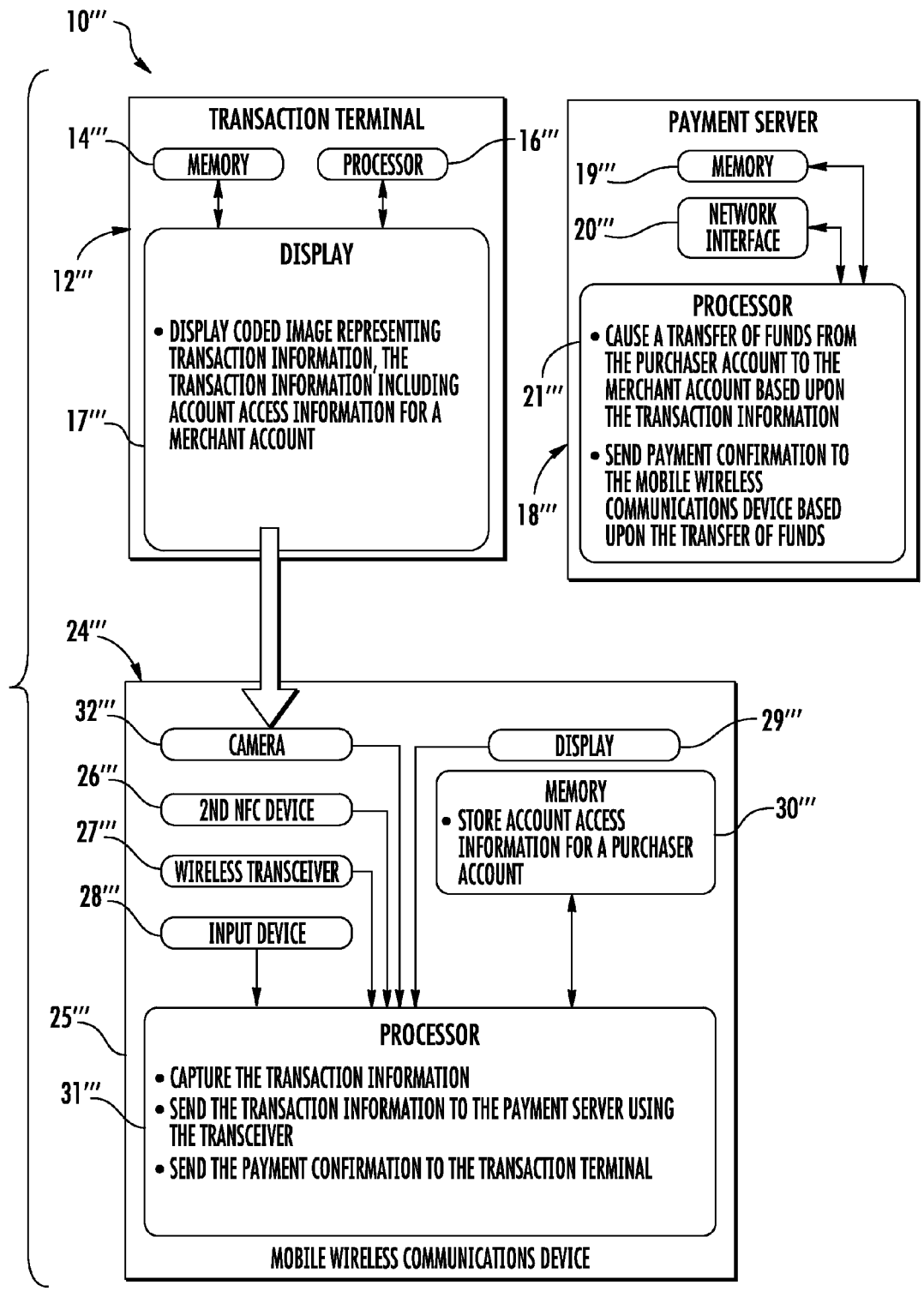
FIG. 4 is a schematic block diagram of an embodiment of a payment processing system where a transaction terminal has a display displaying a coded image thereon, in accordance with the present disclosure.

In some situations, the coded image may be displayed by the display 17" of the transaction terminal 12" and not by the substrate 22". Such an embodiment is shown in FIG. 4. Here, the display 17''' displays a coded image representing the transaction information, and the camera 32''' of the mobile wireless communications device 24''' captures the image, then determines the transaction information based thereupon. Operation of the payment processor system 10''' then continues as described above.

Figure 5:
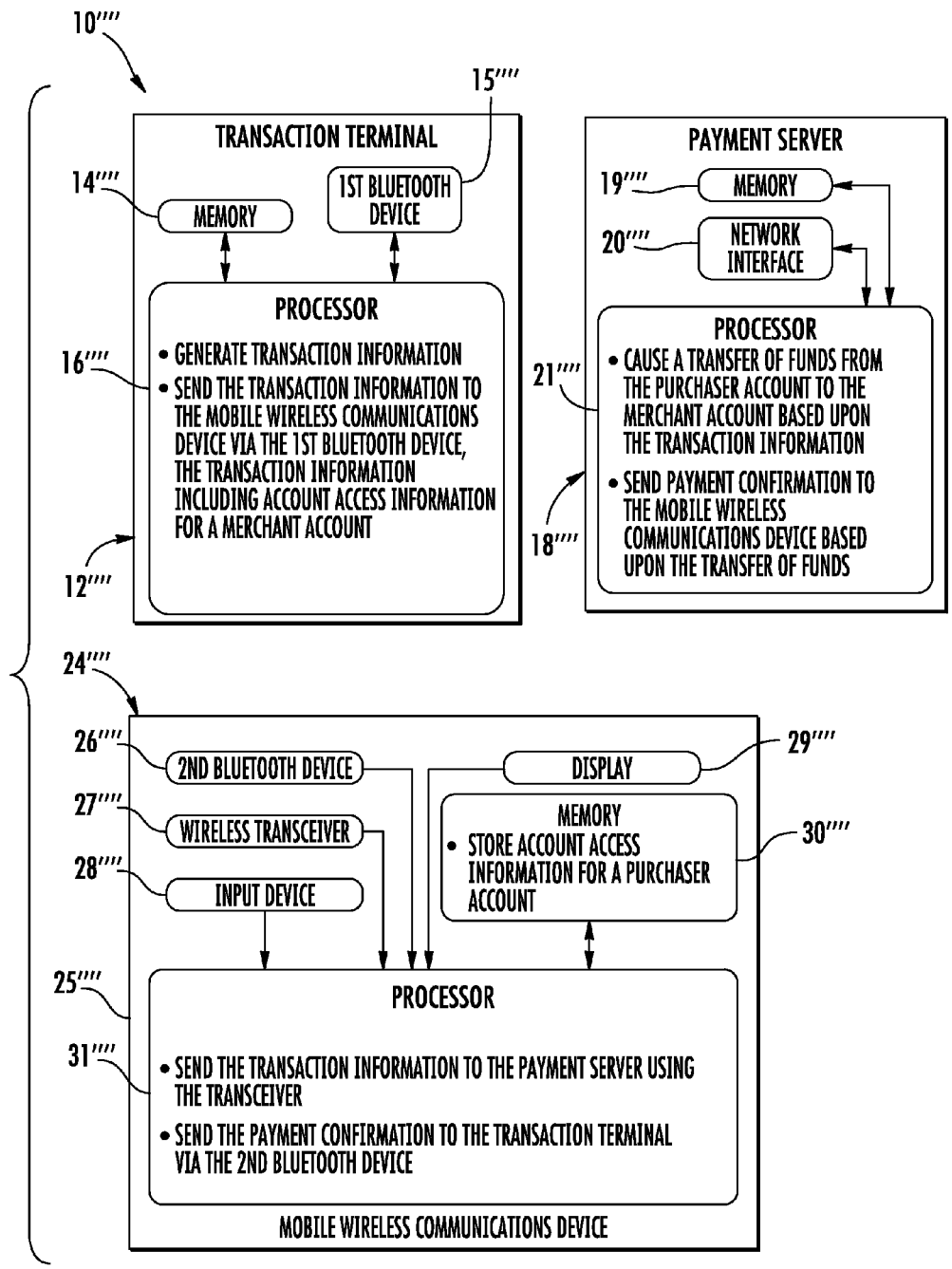
FIG. 5 is a schematic block diagram of an embodiment of a payment processing system including first and second Bluetooth devices, in accordance with the present disclosure.

As will be understood by those skilled in the art, in some embodiments, there may be first and second Bluetooth devices 15'''', 26'''', rather than first and second NFC devices, as shown in FIG. 5. Here, the transaction terminal 12'''' and mobile wireless communications device 24'''' communicate via Bluetooth. That is, the transaction terminal 12'''' sends the transaction information to the mobile wireless communications device 24'''' via the first Bluetooth device 15'''', and the mobile wireless communications device sends the payment confirmation back to the transaction terminal via the second Bluetooth device 26''''.

Figure 6:
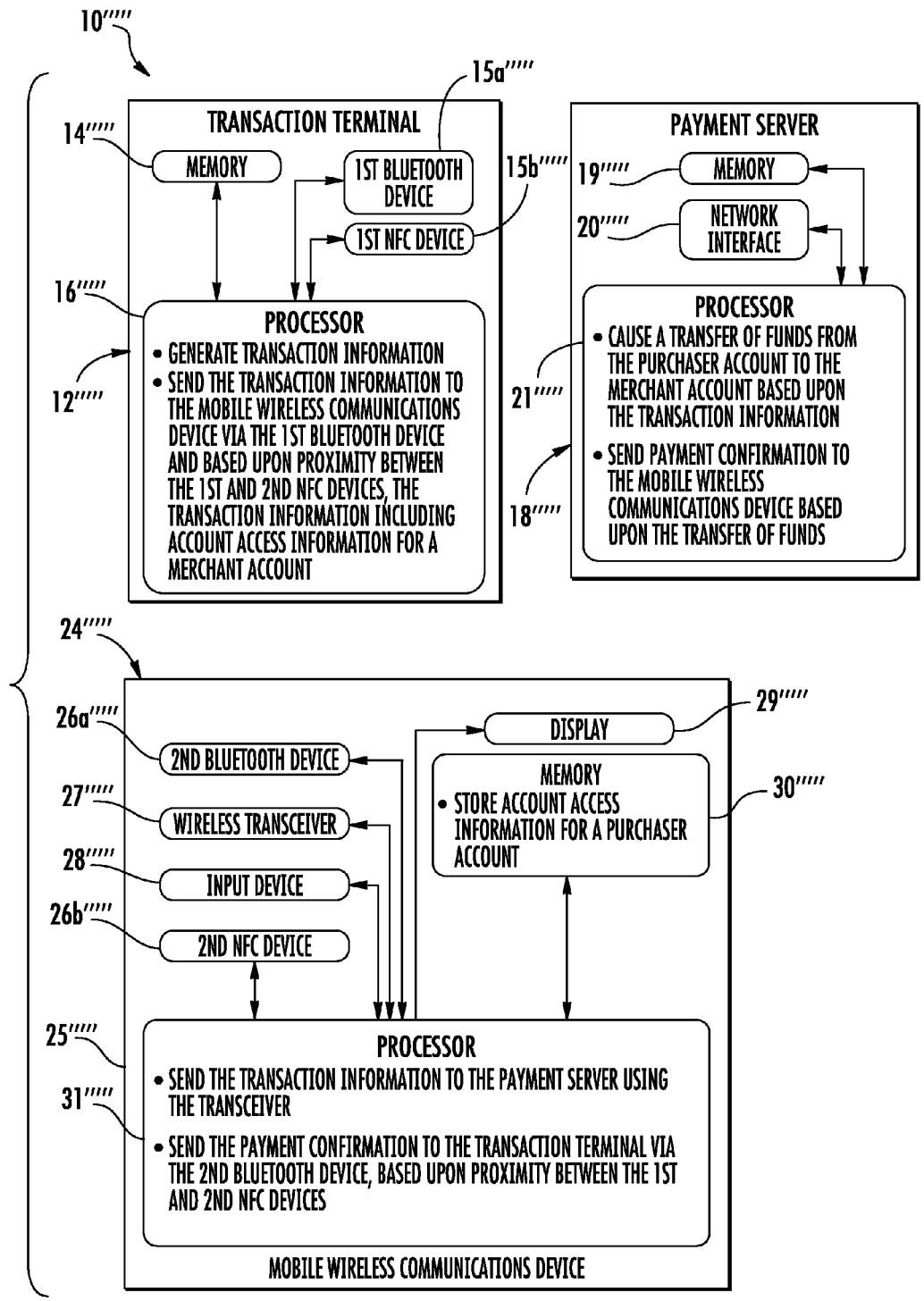
FIG. 6 is a schematic block diagram of an embodiment of a payment processing system including first and second NFC devices, and first and second Bluetooth devices, in accordance with the present disclosure.

Of course, in some applications, there may be both first and second Bluetooth devices 15'''', 26'''' as well as first and second NFC devices. An example embodiment with these features is shown in FIG. 6. Here, the transaction terminal 12''''' include a first Bluetooth device 15a''''' and a first NFC device 15b'''''. Likewise, the mobile wireless communications device 24''''' includes a second Bluetooth device 26a''''' and a second NFC device 26b'''''. The transaction terminal 12''''' may send the transaction information to the mobile wireless communications device 24''''' via the first and second Bluetooth devices 15a''''', 26a''''' based upon proximity between the first and second NFC devices 15b''''', 26b'''''. It should be understood that the transaction information may be sent after the first and second NFC devices 15b''''', 26b''''' are no longer in proximity, but had previously exchanged NFC communications, for example. In addition, the mobile wireless communications device 24''''' may send the payment confirmation to the transaction terminal 12''''' based via the first and second Bluetooth devices 15a''''', 26a''''' based upon proximity between the first and second NFC devices 15b''''', 26b'''''.

In some applications, the transaction terminal 12''''' may even send the transaction information to the mobile wireless communications device 24''''' via the first and second Bluetooth devices 15a''''', 26a''''', over a Bluetooth communications channel established based upon a QR code detected via a camera, for example.

Figure 7:
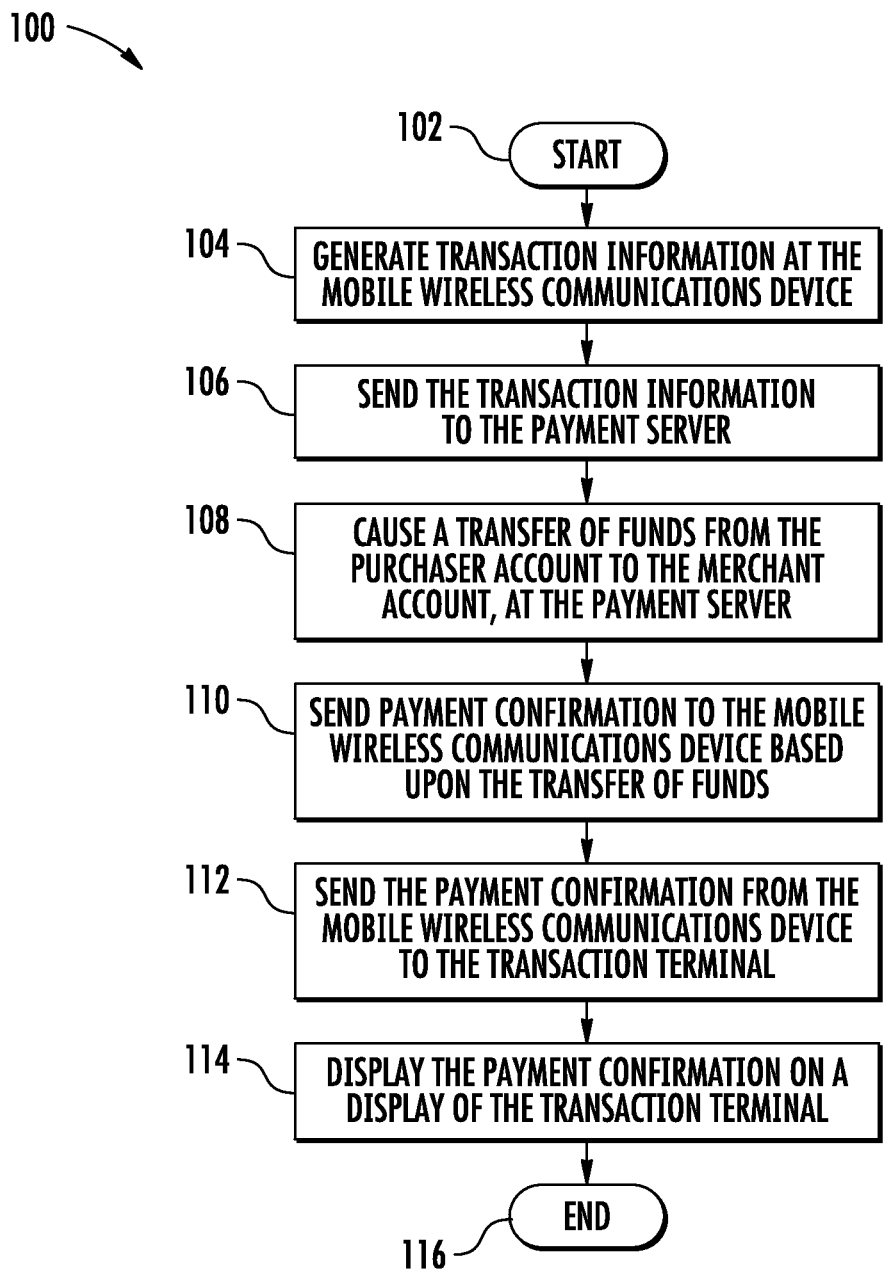
FIG. 7 is a flowchart of a method of operating the payment processing system of FIG. 1.

A method of operating the payment processing systems described above is now described with reference to the flowchart 100 of FIG. 7. After the start (Block 102), transaction information is generated at the mobile wireless communications device (Block 104). Then, the transaction information is sent to the payment server (Block 106).

Next, the payment server causes a transfer of funds from the purchaser account to the merchant account (Block 108).

Thereafter, the payment server sends payment confirmation to the mobile wireless communications device based upon the transfer of funds (Block 110).

The payment confirmation is then sent from the mobile wireless communications device to the transaction terminal (Block 112). The payment confirmation is then displayed on the display of the transaction terminal (Block 114). Block 116 indicates the end of the method.

Example components of a mobile wireless communications device 1000 that may be used in accordance with the above-described embodiments are further described below with reference to FIG. 8. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 8:
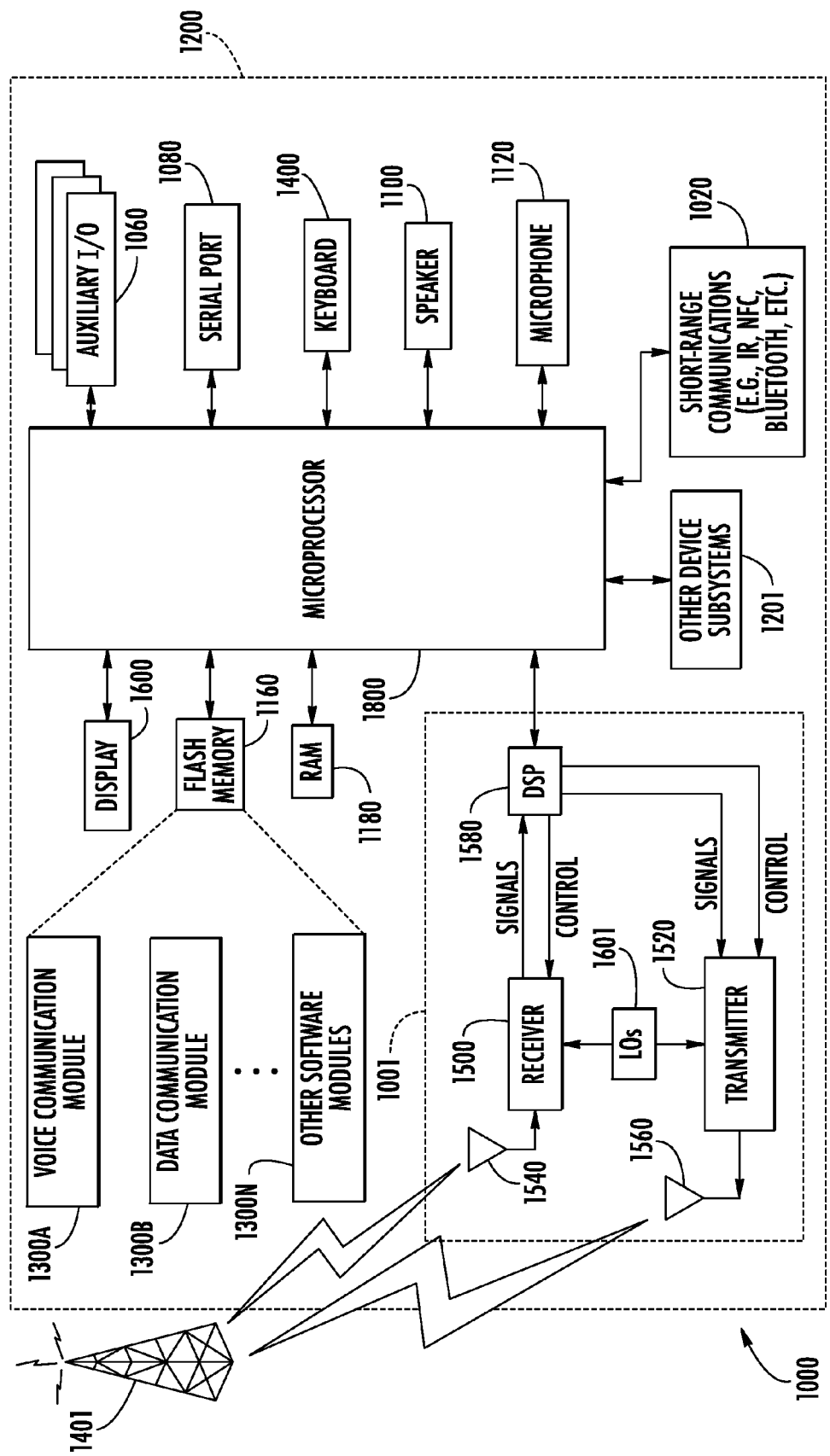
FIG. 8 is a schematic block diagram illustrating example components of a mobile wireless communications device that may be used with the payment processing systems of FIGS. 1, 2, 3, 4, 5 and 6.

In addition to the processing device 1800, other parts of the mobile device 1000 are shown schematically in FIG. 8. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A payment processing system comprising:
   a transaction terminal having a merchant account associated therewith, and said transaction terminal comprising a first wireless device;
   a payment server; and
   a mobile wireless communications device having a purchaser account associated therewith, and said mobile wireless communication device comprising a second wireless device and a processor coupled to said second wireless device, said processor configured to send transaction information to said payment server;
   said payment server configured to cause a transfer of funds from the purchaser account to the merchant account based upon the transaction information, and to send payment confirmation to said mobile wireless communications device based upon the transfer of funds;
   said processor configured to send the payment confirmation to said transaction terminal via said first and second wireless devices.

2. The payment processing system of claim 1, wherein said first and second wireless devices comprise first and second near field communications (NFC) devices.

3. The payment processing system of claim 1, wherein said first and second wireless devices further comprise first and second Bluetooth devices.

4. The payment processing system of claim 1, wherein said first wireless device comprises a first near field communications (NFC) device and a first Bluetooth device; wherein said second wireless device comprises a second NFC device and a second Bluetooth device; wherein said transaction terminal is configured to send the transaction information to said mobile wireless communications device via said first and second Bluetooth devices, based upon proximity between said first and second NFC devices; and wherein said mobile wireless communications device is configured to send the payment confirmation to said transaction terminal via said first and second Bluetooth devices, based upon proximity between said first and second NFC devices.

5. The payment processing system of claim 1, wherein said transaction terminal comprises a display configured to display the transaction information; and wherein said mobile wireless communications device comprises a camera to capture the transaction information on said display.

6. The payment processing system of claim 5, wherein said display is configured to display the transaction information as a coded image.

7. The payment processing system of claim 1, further comprising at least one substrate having an image thereon and positioned adjacent said transaction terminal; wherein said mobile wireless communications device comprises a camera to capture the image; and wherein said processor is configured to generate the transaction information based upon the captured image.

8. The payment processing system of claim 7, wherein the image on said at least one substrate comprises a coded image.

9. The payment processing system of claim 1, further comprising at least one NFC tag having data stored thereon and positioned adjacent said transaction terminal; and wherein said processor is configured to cooperate with said second NFC device and generate the transaction information based upon the stored data.

10. The payment processing system of claim 1, wherein said transaction terminal comprises a display and is configured to present the payment confirmation on said display.

11. A mobile wireless communications device having a purchaser account associated therewith and comprising:
    a first wireless component; and
    a processor coupled to the first wireless component, the processor configured to
       send transaction information to a payment server, wherein the payment server is configured to cause a transfer of funds from the purchaser account to a merchant account associated with a transaction terminal comprising a second wireless component based upon the transaction information,
       receive payment confirmation from the payment server based upon the transfer of funds, and
       send the payment confirmation to the transaction terminal via the first and the second wireless components.

12. The mobile wireless communications device of claim 11, wherein the first and the second wireless components comprise first and second near field communications (NFC) components.

13. The mobile wireless communications device of claim 11, wherein the first and the second wireless components further comprise first and second Bluetooth components.

14. The mobile wireless communications device of claim 11, wherein the first wireless component comprises a first near field communications (NFC) component and a first Bluetooth component; wherein the second wireless component comprises a second NFC component and a second Bluetooth component; wherein the processor is configured to receive the transaction information sent from the transaction terminal via the first and the second NFC components; and wherein the processor is configured to send the payment confirmation to the transaction terminal via the first and the second Bluetooth components, based upon proximity between the first and the second NFC components.

15. The mobile wireless communications device of claim 11, further comprising a camera to capture the transaction information on a display of the transaction terminal configured to display the transaction information.

16. The mobile wireless communications device of claim 11, further comprising a camera to capture an image on at least one substrate and positioned adjacent the transaction terminal; and wherein the processor is configured to generate the transaction information based upon the captured image.

17. The mobile wireless communications device of claim 16, wherein the image on the at least one substrate comprises a coded image.

18. The mobile wireless communications device of claim 11, wherein the processor is configured to cooperate with the first NFC component and generate the transaction information based upon stored data on at least one NFC tag positioned adjacent the transaction terminal.

\* \* \* \* \*